Oct. 28, 1958  D. NABA  2,857,811
COLOUR TONE FILTER FOR PHOTOGRAPHY
Filed Oct. 29, 1954
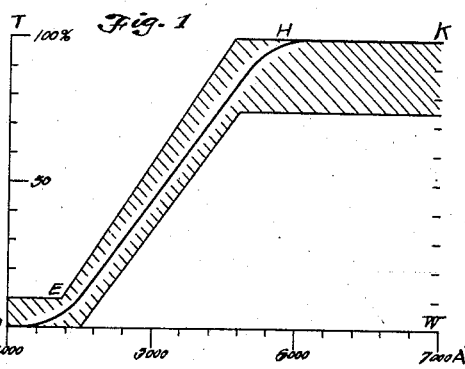
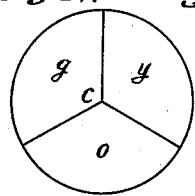
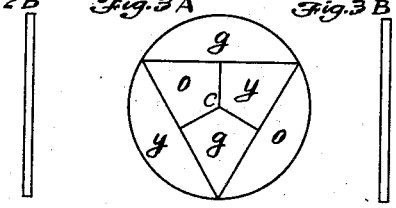
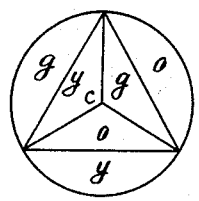
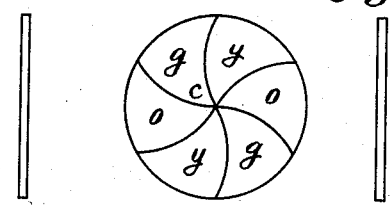
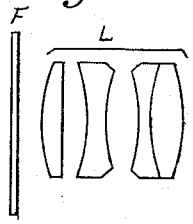
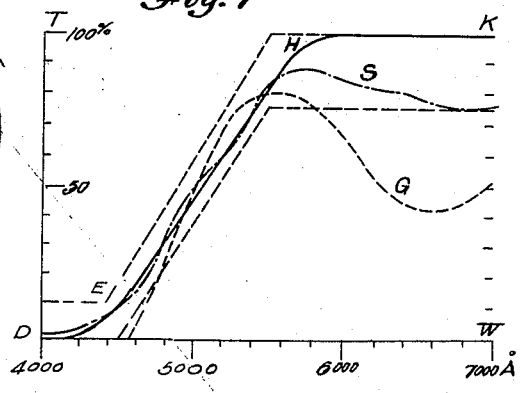

United States Patent Office 2,857,811
Patented Oct. 28, 1958

2,857,811

COLOUR TONE FILTER FOR PHOTOGRAPHY

Daito Naba, Sendai, Japan

Application October 29, 1954, Serial No. 465,663

Claims priority, application Japan November 11, 1953

3 Claims. (Cl. 88—111)

This invention relates to a colour tone filter for photography, and more particularly to such a filter which is adapted for all kinds of photography with a desirable transmissibility of light rays.

The principal object of this invention is to provide a colour tone filter for photography which enables to give precisely and substantially the same colour tone as that of an object, namely a body or a scenery to be photographed, to its photograph with one and the same filter.

Other objects and features will be apparent as the following description proceeds, reference being had to the accompanying drawings which, by way of examples, show some embodiments of this invention.

Fig. 1 shows curves for illustrating the theoretical transmissibility and allowable region thereof in connection with this invention.

Figs. 2A, 3A, 4A and 5A are front views of various filters embodying this invention.

Figs. 2B, 3B, 4B and 5B are the side views of the filters shown in Figs. 2A to 5A, respectively.

Fig. 6 is a diagrammatic representation of an optical system in which a filter according to this invention is disposed at the front of photographic lenses.

Fig. 7 is a curve showing a transmissibility of a filter according to this invention, as compared with that of the ideal and ordinary filters, the curves S and G being plotted in case of combining the filters with optical systems respectively.

"Colour tone filter" is referred to a filter according to this invention, throughout this specification and claims, since the filter according to this invention enables to give precisely and substantially the same colour tone including brightness and slight contrast thereof as that of an object to be photographed to its photograph, in a general white and black photograph as well as a colour photograph.

By using a photographic filter heretofore known, such striking colour tone difference as between blue and red or blue and orange can be distinguished on a photograph. It is, however, almost impossible to distinguish such slight colour tone difference as between blue green and green or green and yellow green.

A colour tone filter according to this invention can, of course, be well used in the photography of general objects and it also enables to give slight colour tone difference to a photograph taken of an object having slight colour tone contrast, such for example as a field which is viewed substantially as all green, a kind of cloth having undistinguished colours, an inanimate object or the like, the photograph being made without any skillful art.

Moreover, it has been usual to use exchangeably several kinds of photographic filters corresponding to the colour tone or the illuminating conditions of the object. According to this invention, on the contrary, only one and the same colour tone filter can be used for the same purpose as above in spite of the conditions of the object.

A colour tone filter according to this invention is based upon the following principle of colour distinction:

First, the sensibility of eye for visible rays is maximum in yellow having wave length of about 5550 A., while the best ability of eye for distinguishing the difference between wave lengths of illuminating light lies at three points of about 4400 A., 4900 A. and 5900 A. That is, although our eyes can detect the lights ranging from wave length of about 3800 A. to about 8100 A., the range in which the eyes can especially well distinct the colour and brightness is limited to the narrow band of wave length from about 4400 A. to about 5900 A. This is the reason why we are scarcely suffering from remarkable chromatic aberration even though the eye is composed of a crystalline single lens. Accordingly, it will be understood that the slight colour tone difference of an object can precisely be obtained on its photograph, if a filter in which the transmissibility at the wave length band ranging from about 4400 A. to about 5900 A. is linear and possibly steep with regard to the wave length is adopted.

Second, general objects in the daytime reflect so much amount of blue and violet lights which lie at the wave length band less than about 4400 A. that such lights are apt to give not only a factor of excessive exposure but also disturbance to distant photography. Accordingly it is preferable to cut off such lights of short wave lengths, if possible.

Third, the sensibility of eye for orange and red lights which lie at the wave length band more than about 5900 A. is suddenly reduced with increase of the wave length. This means that we cannot feel red, if it is not so strong enough. Accordingly it is necessary that possibly much amount of light having the long wave length passes through a filter.

As seen from the above three points, the transmissibility curve of a filter which has ideal filter effect is to be the curve DEHK represented by the thick full line as shown in Fig. 1, numerals of the abscissa W indicating wave length of illumination light in A. and those of the ordinate T transmissibility in percent.

An ordinary photo-chemical emulsion, however, has some allowance for the exposure so that the transmissibility of a desired filter is not always represented by only one curve as above. In actual, if a filter has the transmissibility which is less than 10% at the light of short wave length less than 4400 A., more than 75% at the light of long wave length more than 5500 A. and linear at all the wave length band at least ranging from 4500 A. to 5500 A., such a filter will show available filtering effect. Namely, a filter which has the characteristic in which transmissibility curve to the lights always lie within the region shown by oblique lines in Fig. 1 and the part EH is possibly linear may actually show the available filtering effect.

Moreover, it is usual that the contrast coefficient of the photo-chemical emulsion is great to the lights of short wave length such as blue and violet as well as to the lights of long wave length such as orange and red, and minimum to the lights of intermediate wave length such as green and its adjacent colours. Accordingly the filter which has the transmissibility curve as above described is used to obtain the result that the colour tone distinctability in green and yellow is greatly increased and the linear part of the characteristic curve (part to be properly exposed) of photo-chemical emulsion is utilized at almost all the visible spectrum, thereby usefully attaining the purpose of giving, as precisely as possible, the colour tone of the object to its photograph.

In accordance with this invention, I provide a filter based upon the above principle which has never been considered by anyone else. That is, the colour tone filter according to this invention has effects in which the disturbance of excessive exposure is suppressed at the light of short wave length less than about 4400 A., slight difference of colour tone is well shown at the main part of the spectrum ranging from about 4400 A. to about 5900 A. and plenty exposure is obtained to give clear colour tone at the light of long wave length more than about 5900 A. for which we feel in dull distinction with eyes.

In order to make the colour tone filter which has the transmissibility curve as shown by the full line DEHK of Fig. 1, it is understood to combine three colour filters, or a green, yellow and orange ones in adequate rate of area. Accordingly this invention can be carried out into effect in various modifications.

Now referring to Figs. 2A, B to 5A, B, g is a green filter, o an orange one and y a yellow one, each filter being made of a thin piece of film of transparent material. The colour tone filter shown in Figs. 2A and B is combined by the three colour filters, each being a sector having the angle of 120 degrees subtended at the centre of the combined filter. The colour tone filters shown in Figs. 3A and B, Figs. 4A and B and Figs. 5A and B have equal area which is included in a circle of any radius having the centre of the combined filter at C. It is also apparent from the Figs. that the three colour filters are disposed symmetrically with respect to the centre of the combined filter.

Experiments made in connection with a colour tone filter thus obtained according to this invention show that transmissibility measured regarding wave length is plotted as the chain line S of Fig. 7. This curve lies substantially along the theoretical curve DEHK which is inscribed for the sake of comparison in this figure, numerals of the abscissa W indicating the wave length in A., those of the ordinate the transmissibility in percent and the upper and lower dotted lines limiting the allowable region corresponding to those of Fig. 1.

The colour tone filter in accordance with this invention can be made as a solid filter, a gelatine filter or interference filter, in which the three colour filters or a green, yellow and orange filters are combined so as to have the transmissibility curve as shown in Fig. 1. In the gelatine filter, it can be manufactured by attaching gelatine film between two transparent parallel plates of glass or composed resin.

Although Figs. 2 to 5 show circular filters, a square or a hexagon filter can also be made according to its holder. In this case, whenever the filter construction in the circumscribed circle is similar to that already described, there is no change in characteristic. In the solid or sandwich type gelatine filter, treatments for preventing reflection and increasing transparency can be applied to one or both side planes of the filter to improve the characteristic.

It is convenient to utilize the colour tone filter according to this invention by arranging the same in the front of a lens system as shown in Fig. 6 in which L designates suitable photographic lenses and F the filter according to this invention. It is, however, frequently available in some cameras that the filter according to this invention is arranged adjacent the back of the photographic lens or in a shutter mechanism. Furthermore, the above mentioned filter film according to this invention can be used with such condition that the film is directly attached to the surface of the photographic lens itself. In a camera which has a revolving sector type shutter, such as a movie camera, the filter film according to this invention can also be arranged at the opening of the shutter. The colour tone filter can also be arranged at the opening of the focal plane type of the similar type shutter, but it, in this case, is limited to use only in the instantaneous exposure. The colour tone filter can be utilized in a general white and black photography as well as an ordinary movie or a colour photography or a colour movie. In the white and black photography the colour tone filter according to this invention must, as a fundamental principle, be used for panchromatic emulsion. In the colour photography, it is preferable to use the colour filter for the daytime use film (5400° K.) in case of the sun light and for the electric lamp use film (3200° K.) in case of the lamp light.

As has been described, the colour tone filter according to this invention is made based upon the above principle so that it has the important characteristics in which the colour tone and also its slight difference of the object are given precisely to either a white and black or a colour photograph. Besides the above, the colour tone filter has some other advantages:

First, the colour tone filter scarcely absorbs the light of long wave length more than about 5900 A. so that there is no need to increase the exposure magnification of the filter. Second, the colour tone filter can cut off the light of short wave length less than about 4400 A. so that it is adapted for the distant photography. That is, it has also the effect of emphasizing filter. Third, the colour filter has the combination as shown in Figs. 2A, B, 3A, B, 4A, B and 5A, B so that there is no change in the effect notwithstanding the aperture size of the photographic lens.

Moreover, the colour tone filter has some degrees of colour temperature adjusting effect in the colour photography. Namely, the filter absorbs the short wave band of the spectrum so that it has the similar colour temperature adjusting effect, in case of cloud daytime (so called excessive colour temperature) to that in an amber colour filter. In the electric light source (so called less colour temperature), on the contrary, the colour filter reduces the disturbance of excessive exposure for red, because the total exposure will be done with short time.

Further, in either case of a white and black of a colour photography, the colour tone filter absorbs the diffused light of short wave in case of using the filter in the back light so that the filter has some degrees of halation preventing effect and good sensibility for the light of long wave with the result that the shadow parts of the photograph are not dropped.

Some comparisons between the filter according to this invention and heretofore known filters are now taken. For the colour photography, colour movie, trichromatic photogravure or the like, a filter composed of some kinds of colours has been frequency used, but such a filter is not made based upon the above described principle. Accordingly any filter heretofore known is not made by combining the three colours only; green, orange and yellow. There are, in the trichromatic photogravure, some filters which are mainly made for the purpose of making a desired spectrum composition of the light arriving at emulsion surface according to the kinds of colours of the object. Such filters are different, in object, principle and construction, from the filter according to this invention which is made to distinct precisely the colour tone difference of the object on its photograph. Further, for the purpose of substantially adjusting the colour tone of the object to the feeling of the eyes, there is a so called "adjusting filter" which is broadly used as a green filter. Such a filter, however, has, for example, the transmissibility curve G as shown in Fig. 7 which is greatly separated from the curve DEHK so that it has scarcely distinction effect for colour tone.

The result of the measurement of the transmissibility of a colour tone filter according to this invention, the measurement being made in connection with respective wave length by using a spectroscope, is inscribed in the following table (Measurement has been made at The Science Measurement Laboratory of the Tohoku University of Japan):

| filter | | colours in a filter | | | filter combined, percent |
|---|---|---|---|---|---|
| colours | wave length, A. | yellow, percent | green, percent | orange, percent | |
| blue | 4,400 | 17 | 1 | 0 | 6 |
|  | 4,600 | 31 | 12 | 0 | 14 |
|  | 4,800 | 60 | 40 | 0 | 33 |
| green | 5,000 | 85 | 62 | 1 | 49 |
|  | 5,200 | 90 | 77 | 14 | 60 |
|  | 5,400 | 90 | 83 | 62 | 78 |
| yellow | 5,600 | 90 | 84 | 85 | 86 |
|  | 5,800 | 90 | 79 | 89 | 86 |
| orange | 6,000 | 90 | 70 | 90 | 83 |
|  | 6,200 | 90 | 62 | 90 | 81 |
| red | 6,400 | 90 | 56 | 90 | 79 |
|  | 6,600 | 90 | 50 | 90 | 77 |
| dark red | 6,800 | 90 | 47 | 90 | 76 |
|  | 7,000 | 90 | 48 | 90 | 76 |

It is noted that the above described characteristic and filtering effect of the colour tone filter according to this invention and the experimental result therefor are obtained when the colour tone filter is combined with an optical system, for example, as shown in Fig. 6.

What is claimed is:

1. A colour tone filter for photography comprising in combination a green filter, an orange filter, and a yellow filter, said coloured filters being disposed rigidly and integrally with one another so as to occupy substantially equal areas at different positions of one plane and cooperating to specify the spectral transmission characteristics in which the transmissibility for the light of wave length of less than 4400 A. is less than 10%, that for the light of wave length of more than 5500 A. is more than 75%, and that for the total band ranging at least from 4500 A. to 5500 A. is increased substantially in linear relation with the increase of the wave length.

2. A colour tone filter for photography as claimed in claim 1, comprising in combination a green filter having transmissibilities of substantially 1% for 4400 A., 62% for 5000 A. and 84% for 5600 A., an orange filter having transmissibilities of substantially 0% for 4400 A., 1% for 5000 A. and more than 85% for longer than 5600 A., and a yellow filter having transmissibilities of substantially 17% for 4400 A., 85% for 5000 A. and 90% for longer than 5200 A., said coloured filters being combined to specify the spectral transmission characteristics in which the combined filter has transmissibilities of substantially 6% for 4400 A., 14% for 4600 A., 33% for 4800 A., 49% for 5000 A., 56% for 5200 A., 78% for 5400 A. and more than 80% for from 5600 A. to 6200 A.

3. A colour tone filter for photography as claimed in claim 1 comprising in combination a plurality of green filters, a plurality of orange filters and a plurality of yellow filters, said filters being combined integrally with one another and symmetrically with respect to the centre of the combined filter and occupy equal areas at different positions of one plane, the total added area of the same colour being also equal.

References Cited in the file of this patent

UNITED STATES PATENTS

| 727,524 | Willsie | May 5, 1903 |
| 1,746,584 | Fournier | Feb. 11, 1930 |
| 2,460,507 | Johnston | Feb. 1, 1949 |

FOREIGN PATENTS

| 538,990 | Great Britain | Aug. 25, 1941 |

OTHER REFERENCES

Kodak Reference Handbook, Filter Section, published by Eastman Kodak, Rochester, New York, 1945, page 28 cited.